United States Patent [19]

Hayatdavoudi et al.

[11] Patent Number: 5,755,295
[45] Date of Patent: May 26, 1998

[54] MODULAR DRILLING FLUID SYSTEM AND METHOD

[75] Inventors: Asadollah Hayatdavoudi, Lafayette, La.; Maziar Hayatdavoudi, San Jose, Calif.

[73] Assignee: Spectral Inc., Church Point, La.

[21] Appl. No.: 635,354

[22] Filed: Apr. 19, 1996

[51] Int. Cl.⁶ .................................................. C09K 7/00
[52] U.S. Cl. .......................... 175/65; 507/106; 507/206
[58] Field of Search ..................... 175/65, 72; 166/312; 507/106, 206

[56] References Cited

U.S. PATENT DOCUMENTS

| | | |
|---|---|---|
| 3,726,850 | 4/1973 | Detroit . |
| 3,746,109 | 7/1973 | Darley . |
| 4,045,357 | 8/1977 | Reed . |
| 4,615,813 | 10/1986 | Bretz . |
| 4,799,549 | 1/1989 | Vinot et al. . |
| 5,124,312 | 6/1992 | Wang . |
| 5,311,945 | 5/1994 | Cowan et al. . |
| 5,318,954 | 6/1994 | Mueller et al. . |
| 5,333,698 | 8/1994 | Van Slyke . |
| 5,358,050 | 10/1994 | Schmidt . |
| 5,361,842 | 11/1994 | Hale et al. . |
| 5,374,361 | 12/1994 | Chan . |
| 5,385,206 | 1/1995 | Thomas . |
| 5,399,548 | 3/1995 | Patel . |

Primary Examiner—Roger J. Schoeppel
Attorney, Agent, or Firm—Wenderoth, Lind & Ponack

[57] ABSTRACT

A modular drilling mud system is described in terms of five different modules. A first module contains caustic, a natural wax and a natural thinner. A second module contains components of the first module and an alkali metal aluminate prepared by reacting the first module with aluminum metal. A third module contains the components of the first module and an alkali metal phosphate and/or alkali metal silicate. A fourth module contains the components of the first module, a saturated or unsaturated carboxylic acid source, a surfactant, and a preservative. The fifth module contains a combination of the first, third and fourth modules. The third, fourth and fifth modules can be used to effect various degrees of thinning and lubrication, and the second module can be used alone or in combination with another module to thicken the drilling mud.

9 Claims, 4 Drawing Sheets

MODULAR DRILLING FLUID SYSTEM AND METHOD

TECHNICAL FIELD

The present invention relates to drilling fluids and methods, particularly those involving drilling for oil and gas.

BACKGROUND OF THE INVENTION

The drilling of earth, as in drilling for oil, typically employs a rotary drilling apparatus including a drill bit at its lower end. The rotary drilling apparatus creates a significant amount of heat due to friction during the drilling process. Therefore, a lubricant or "drilling mud" is employed to reduce heat buildup in the drilling apparatus. Also, since the earth formations encountered during drilling can vary widely, drilling muds are selected so as to condition the earth for effective removal.

An exemplary drilling mud comprises a gelling agent, such as a solid phase bentonite, a weight agent, such as barite, and water. Numerous different additives to this drilling fluid are also employed to control viscosity, yield point, gel strength (thixotropic properties), pH, fluid loss, tolerance to contaminants such as salt and calcium carbonate, lubricating properties, filter caking properties, cooling and heat transfer properties, and tolerance to inactive solids such as sand and silt or active native mud making clays such as smectites, illites, kaolinites, chlorites, etc. Those skilled in the art recognize that providing an acceptable drilling fluid in the field requires much labor and high material handling and transportation costs. In addition, environmental and occupational safety considerations restrict the types of additives and their amounts in the drilling muds. Also, selected additives should not have fluorescence properties, so that oil deposits can be readily identified.

Over the years, a number of drilling mud formulations have been proposed. For example, U.S. Pat. No. 3,726,850 discloses a lignin dispersing agent for dispersing clays, and the like. The lignin dispersing agent is reported to have utility in both alkaline and acidic media. A relatively low viscosity aqueous silicate solution is disclosed in U.S. Pat. No. 3,746,109, and is reported to be particularly useful in drilling through shale formations. U.S. Pat. No. 4,799,549 discloses a stable, gel-forming microemulsion comprising an aqueous solution of an alkali metal silicate, a gelling reagent, and a surface active agent (surfactant). This composition is reported to be useful for permanent or reversible plugging or clogging of subterranean formations. Also, U.S. Pat. No. 5,374,361 discloses a composition for cleaning out cased well-bores, and the like, using a fluid that includes a caustic alkyl polyglycoside surfactant formulation. This formulation is reported to be more biodegradable than previous detergent systems. A further additive encountered in aqueous drilling fluids is a metal compound, such as that described in U.S. Pat. No. 5,399,548, or a derivative of a metal compound such as a hydroxy-aluminum compound provided in a polymer, such as disclosed in U.S. Pat. No. 4,045,357. U.S. Pat. No. 5,333,698 also discloses a drilling fluid additive in combination with a white non-toxic mineral oil.

Most of the additives discussed above and those employed in the industry are utilized only as additives. That is, they cannot be provided easily, safely, and economically as a "whole mud" system specifically designed to accomplish a given drilling task. Thus, a drilling mud system is desired which can be applied in a modular fashion with one or more modules being used as needed for a particular set of requirements. Such a system should also enable a person skilled in the art to convert an old mud formulation, e.g., salt muds, lime muds, low solid muds, oil muds, etc., into such a modular system.

There is also an urgent need for improved labor health and safety in working with drilling muds, improved cleanliness of rig flooring and equipment, environmental safety and nontoxicity of additives, as well as reduced handling and storage costs.

SUMMARY OF THE INVENTION

The present invention is for a drilling mud system conveniently formulated as at least one of the following modules:

(1) an alkaline first module that contains a source of caustic, a natural wax, and a natural thinner;

(2) a second module prepared by reacting aluminum metal with the components of the alkaline first module thereby forming a soluble alkali metal aluminate;

(3) a third module containing the components of the first module in combination with at least one of an alkali metal phosphate and sodium silicate;

(4) a fourth module containing the components of the first module in combination with a saturated or unsaturated carboxylic acid source, a surfactant, and a preservative; and (5) a fifth module containing the components of the first module in combination with a saturated or unsaturated carboxylic acid source, a surfactant, a preservative, and at least one of an alkali metal phosphate and sodium silicate.

A drilling mud represented by any of the third, fourth and fifth modules can be used for simultaneous thinning and lubricating operations. A drilling mud represented by the second module can be used for thickening operations.

Preferably, the first module is composed of a "scour kier liquor"—which contains a caustic at a pH of 11 or above, as well as a natural wax and a natural thinner, such as a lignin and/or a tannin. The scour kier liquor referred to herein is typically obtained by the alkaline digestion of cellulosic fibers, e.g., cotton pulp, and is described further hereinbelow.

Preferably, the second module is an aluminated scour kier liquor in which aluminum metal has been reacted with the scour kier liquor to produce aluminate ions in the presence of lignins and/or tannins. The aluminate ions react with the lignins and tannins, thereby crosslinking them and increasing the cutting suspension capability of the drilling mud.

The third module preferably is composed of the components of the first module in combination with at least one alkali phosphate, such as a mono-, di-, or tri- sodium, potassium, or cesium phosphate, e.g., trisodium phosphate (TSP), as well as sodium silicate, and lignite. Such a formulation produces a high pH primary thinner for poor, thick, and water thirsty mud. Optionally, the third module can contain borax.

Preferably, the fourth module contains, in combination with the components of the first module, a saturated or unsaturated carboxylic acid rich source, such as vegetable oil or a natural ester, e.g., cottonseed oil, jojoba oil, and the like, as well as a surfactant, which enhances the emulsification of oil and esters. Also, it is preferred that this module contains a preservative, such as a chelating agent, e.g., ethylenediamine tetraacetate (EDTA).

The fifth module preferably includes the components of the first, third and fourth modules identified above. More preferably, the first module is represented by kier liquor.

Also contemplated is a drilling mud kit comprising a plurality of containers, with each of their contents defined as described hereinbelow.

Another aspect of the present invention is a drilling method employing an instant drilling mud. Such method comprises injecting at least one of the aforementioned modules into a borehole prior to or during drilling, and commencing or continuing drilling into the earth.

A statistical comparative analysis, described hereinbelow, demonstrates that an instant modular drilling mud system affords a drilling fluid distinctly superior to previous available products. These data are presented in the Tables hereinbelow and in the Figures.

The invention is now described in more detail with reference to particular examples and the figures.

DETAILED DESCRIPTION OF THE INVENTION

The present invention is for a drilling mud system and associated method for using the system. The drilling mud system is comprised of one or more modules of prepackaged chemical components. Each module contains flexible concentrations of its various chemical components, which permits a user to achieve a desired level of thinning, thickening, and lubricity in the drilling fluid system. The prepackaged modules can be employed either alone or in combination with another module to produce a drilling mud system having the desired properties. Each of these modules is discussed separately hereinbelow.

Module 1

Module 1 is the principal drilling fluid of the instant drilling mud system. It can be used alone or in combination with one or more of the other modules as discussed hereinbelow. Module 1 is a caustic (alkaline) drilling mud. This composition further comprises one or more natural waxes and one or more natural thinner. Typically the pH of a Module 1 formulation is 11 or greater. Such a high pH increases the dispersability of clays, thereby facilitating the drilling operation.

A natural wax used in this composition facilitates the formation of emulsions and assists in coating solid particles released by drilling. Exemplary natural waxes which can be used in the composition are montan wax, waxes extracted from carnauba palm tree, cotton, lintres, lignite deposits, and the like.

A natural thinner is also provided in Module 1, and as used herein refers to a natural colloidal clay dispersion. Exemplary natural thinners include lignins, tannins and negatively charged derivatives of humic acid.

The combination of caustic, natural wax, and natural thinner as described above is sometimes referred to herein as a "scour kier liquor", and is a principal ingredient of the instant drilling mud system.

A preferred scour kier liquor is commercially available from Barnhardt Industries (Charlotte, N.C.). The kier liquor may also be combined with oxidizing agents such as peroxide, sodium hypochlorite, and the like.

Module 2

This module represents a mud thickener or oil solidifier in which aluminate ions have been provided. Whenever the aluminate ions are added to the drilling mud prior to pulling the drill assembly out of the hole, the gel strength of the mud increases. This means that the thixotropic properties of the drilling fluid can be changed as desired, thus permitting cuttings entrained in the mud to be suspended. This module is added to a mud system also when it loses thixotropic characteristics or allows weight material to settle rapidly. In addition, whenever any of Module 1, discussed above, and Modules 3 and 4, discussed below, are combined with oil, the addition of Module 2 causes the oil to solidify, i.e., to a rubbery or thick grease. The degree of oil solidification can be readily altered by adjusting the concentration of aluminum metal, which results in a change in the concentration of aluminate ions.

Preferably, the aluminated composition of Module 2 comprises an alkali metal aluminate in combination with the scour kier liquor described above. Any alkali metal aluminate can be used; however, a particularly preferred alkali metal aluminate is sodium or potassium aluminate.

A preferred Module 2 formulation can be prepared by combining aluminum metal, in the form of shavings, fines, and the like, with sodium hydroxide and water in the presence of lignins or tannins. The caustic reacts with the aluminum metal to produce sodium aluminate and hydrogen gas. Some of the aluminate ions so formed react with the lignins or tannins, thereby crosslinking them. It is believed that whenever the cross-linked product is added to a clay suspension a partially reversible net charge is placed on the clay particles, which increases the gel strength of the mud.

A suitable alkaline gel, or thickener, can be prepared by adding 0.2–1.5 lb of Al metal to 1bbl of scour kier liquor.

Examples of the use of Module 2 in thickening a drilling mud are shown in Table 1. Thus both Sample base #1 and Sample base #2 comprised water, bentonite and caustic. The bentonite, a natural clay, was present in the amount of 25 pounds per barrel of sample base. The rpm readings of viscosimeter, apparent and plastic viscosities, yield point, gel strength at 10 seconds and 10 minutes, and pH are presented in Table 1. Also shown in Table 1 are the results obtained when either Sample base #1 or #2 is combined with Module 2 in an amount of 1% by volume.

As shown in Table 1, the addition of 1% of Module 2 increases the torquometer readings at both 300 and 600 rpm. Also, the viscosities are increased with the plastic viscosity increasing by 2 centipoises, e.g., a 18% change. Significantly, the gel strength at 10 minutes increased from 17 to 28 pounds per 100 $ft^2$, which is a 65% increase in the thixotropic effect without changing the viscosity of the drilling mud substantially.

TABLE 1

EXAMPLE OF THICKENING OF MUD BY MODULE #2

| Mud Composition | Sample Base #1* | Sample Base #2* | Sample With Additive† |
|---|---|---|---|
| 600 RPM Reading | 33 | 31 | 37 |
| 300 RPM Reading | 22 | 20 | 24 |
| Apparent Viscosity (Cp) | 16.5 | 15.5 | 18.5 |
| Plastic Viscosity (Cp) | 11 | 11 | 13[1] |
| Yield Point (#/100 ft$^2$) | 11 | 9 | 11 |
| Gel strength(#/100 ft$^2$) | | | |
| 10 sec: | 10 | 8 | 10 |
| 10 min: | 17 | 17 | 28[2] |
| pH | 10 | 10 | 11.5 |

*Water + 25 lb/bbl Bentonite + Caustic
†Aluminated Kier Liquor @ 1% by volume treatment
[1]Increase of 2 centipoises
[2]Thixotropic effect increased by 11 lb/100 ft$^2$ in 10 min.

The effect of adding Module 2 in an amount of about 1–2% on the thixotropic properties of two other muds was also studied.

These results are shown in Table 2 below. In these studies, the gel strength was determined at 10 seconds and at 10 minutes for each mud before and after treatment. As shown by these data, the gel strength is increased dramatically by the addition of Module 2. This is a strongly desired property especially while the drilling fluid is quiescent in a horizontal, lateral, or deviated hole, e.g., in river crossing, environmental remediation wells, or trenching operations.

TABLE 2

EXAMPLE OF THIXOTROPIC EFFECT OF MUD BY ADDING MODULE #2

| | Base Mud #1 | Base Mud #2 | Base Mud #1 & Treatment | Base Mud #2 & Treatment |
|---|---|---|---|---|
| Gel strength (#/100 ft$^2$) | | | | |
| 10 sec gel: | 7 | 7 | 17 | 12 |
| 10 min gel: | 17 | 17 | 47 | 50 |

Module 3

Module 3 of an instant mud drilling system represents a primary thinner formulation. Functionally, this module counter-balances Module 2. In this primary thinner composition, one or both of an inorganic phosphate and an inorganic silicate is combined with a caustic thinning composition as in Module 1. Optionally, lignite can be combined with the other components of this module. The resulting formulation is a high pH super thinner that is particularly useful for poor, thick, and water thirsty muds. Considering the components of the composition, good performance at both low and high temperatures is expected.

A particularly preferred composition with a primary thinner of Module 3 comprises scour kier liquor (containing waxes and other organic materials) in combination with trisodium phosphate (TSP) and sodium silicate. Another preferred formulation includes scour kier liquor, lignite, and TSP, or a mono-, di-, or tri-sodium, potassium, or cesium phosphate, and sodium silicate. When using this composition, the waxes and other organic material (or lignite when it is used) can effectively coat colloid particles to protect them from attack by contaminants while dispersing them at the same time controllably, which produces a stable suspension condition.

A preferred formulation for module 3 can be prepared by combining with lbbl of scour kier liquor, each of 1–50 lb of trisodium phosphate, 0.25–21 lb sodium silicate, and 1–10 lb of borax. The borax is an optional component that is useful in some applications.

Whenever lignite and hot water are used in an amount of about 1.0 to 2.0 pounds per gallon of hot water and, for example, TSP is added, the viscosity of this newly discovered reaction product can be varied from about that of water, representing a thin fluid, to that of a solid tar or asphalt, a very thick material. This material can be used, for instance, to plug a fracture in the hole. This variation in viscosity is due to variations in the concentration of TSP in the composition.

Module 4

This module provides a secondary thinner formulation as well as a surfactant and preservative, which can be combined with any of the previous modules as needed.

Preferred components in this module are those which enhance the emulsification of oil, such as a saturated or unsaturated carboxylic acid rich source, e.g., vegetable oil or a natural ester such as cottonseed oil, jojoba oil, and the like. This component affords a secondary thinning capability. Other preferred anionic or nonionic emulsifiers (surfactants) include those having a suitable HLB (hydrophilic-lipophilic balance), alkylbenzene sulfonates, tergitol, or "TRITON" (available from Union Carbide Corp., Danbury, Conn.).

The preservative present in this module helps to protect against bacteria and is preferably a chelating agent, such as salts of ethylenediamine tetraacetate (EDTA) and borax. Other suitable preservatives include boric acid or derivatives thereof.

A representative formulation of this module is as follows in a water base (lbbl): 1–10 lb borax, 0.5–10 lb borateam (which includes a sulfonated alkyl benzene—anionic surfactant), and 0.2–1 lb EDTA (Na or K salt). About 0.5–10 lb of "TRITON" (a nonionic surfactant) can also be optionally provided.

Module 5

This module represents a combination of Modules 1, 3 and 4 discussed above. This composition is a super-lubricant formulation that is preferably used in treatments of 0.5 to 2.0% by volume. Use of this combination of Modules 1, 3, and 4 increases the lubricity and thinning of a mud dramatically.

Functionally, in the combined modules a polymerized phosphate ester is formed which possesses the high lubricity properties of esters as well as the thinning capabilities of negatively charged phosphate ions. The amount of esterification can be easily altered by adjusting the concentration of phosphate.

A preferred composition for this module, is formed by combining the compositions of modules 1, 3, and 4 in the amounts detailed above with an oil base. Preferably, the oil, such as cottonseed oil, is provided in an amount up to 50% of the total volume. Optionally, up to 20%, and preferably up to 10%, of the oil content can be replaced with a mineral oil, such as FGA.

The composition identified herein as formulation (I) is composed of scour kier liquor (SKL), TSP, borax, borateam, cottonseed oil and water in the relative amounts indicated above.

Module 5 was studied in a treatment of unweighted and weighted muds at constant 1.6 and 1.8 amps. These results are presented in Tables 3–10. The abbreviations are defined in Table 3. FIGS. 1–4 depict the data presented in Tables 7–10.

TABLE 3

LUBRICITY COMPARISON
ONE MONTH OLD, WEIGHTED MUD OF POOR QUALITY
(CONSTANT 1.6 AMPS)

| Mud System | Torquometer Reading[a] (ft-lbf) | Percent of Additive by Volume | RPM | $X_1^2$ (ft-lbf)$^2$ | Motor Torque ft-lbf |
|---|---|---|---|---|---|
| Untreated | 0 | 0% | 2030 | 0.0 | 63.8 |
| Untreated | 7.5 | 0% | 1900 | 56.3 | 68.2 |
| Untreated | 6.7 | 0% | 1900 | 44.4 | 68.2 |
| Untreated | 7.1 | 0% | 1900 | 50.2 | 68.2 |
| Untreated | 7.1 | 0% | 1850 | 50.2 | 70.1 |
| Untreated | 7.1 | 0% | 1850 | 50.2 | 70.1 |
| Average | 7.1 | 0% | 1880 | 50.2 | 69.0 |
| I + F[b] | 0 | 1% | 2030 | 0.0 | 63.8 |
| I + F | 11.7 | 1% | 1850 | 136.1 | 70.1 |
| I + F | 12.9 | 1% | 1850 | 166.8 | 70.1 |
| I + F | 13.8 | 1% | 1860 | 189.1 | 69.7 |
| I + F | 14.6 | 1% | 1860 | 212.7 | 69.7 |
| I + F | 15.4 | 1% | 1880 | 237.7 | 68.9 |
| Average | 13.7 | 1% | 1860 | 188.5 | 69.7 |

[a]The wrench torquometer reading ($X_1$) was measured with the torque adjusted to constant amperage;
[b]F is an optional food grade mineral oil, viscosity modifier, or plasticity agent, and has the brand-name "FGA" (available from Unocal Corp., Brea, CA).

TABLE 4

LUBRICITY COMPARISON
ONE MONTH OLD, WEIGHTED MUD OF POOR QUALITY
(CONSTANT 1.8 AMPS)

| Mud System | Torquometer Reading (ft-lbf) | Percent of Additive by Volume | RPM | $X_1^2$ (ft-lbf)$^2$ | Motor Torque ft-lbf |
|---|---|---|---|---|---|
| Untreated | 0 | 0% | 2030 | 0.0 | 71.8 |
| Untreated | 8.3 | 0% | 1850 | 69.4 | 78.8 |
| Untreated | 8.3 | 0% | 1850 | 69.4 | 78.8 |
| Untreated | 8.8 | 0% | 1850 | 76.6 | 78.8 |
| Untreated | 8.8 | 0% | 1820 | 76.6 | 80.1 |
| Untreated | 8.8 | 0% | 1820 | 76.6 | 80.1 |
| Average | 8.6 | 0% | 1838 | 73.7 | 79.3 |
| I + F | 0 | 1% | 2030 | 0.0 | 71.8 |
| I + F | 20.0 | 1% | 1850 | 400.0 | 78.8 |
| I + F | 22.5 | 1% | 1860 | 506.3 | 78.4 |
| I + F | 22.1 | 1% | 1870 | 487.7 | 78.0 |
| I + F | 23.3 | 1% | 1870 | 544.4 | 78.0 |
| I + F | 25.0 | 1% | 1870 | 625.0 | 78.0 |
| Average | 22.6 | 1% | 1864 | 512.7 | 78.2 |

TABLE 5

LUBRICITY COMPARISON
ONE MONTH OLD, WEIGHTED MUD OF POOR QUALITY
(CONSTANT 1.6 AMPS)

| Mud System | Torquometer Reading (ft-lbf) | Percent of Additive by Volume | RPM | $X_1^2$ (ft-lbf)$^2$ | Motor Torque ft-lbf |
|---|---|---|---|---|---|
| Untreated | 0 | 0% | 2020 | 0.0 | 64.2 |
| Untreated | 7.1 | 0% | 1900 | 50.2 | 68.2 |
| Untreated | 7.1 | 0% | 1900 | 50.2 | 68.2 |
| Untreated | 7.1 | 0% | 1900 | 50.2 | 68.2 |
| Untreated | 7.1 | 0% | 1900 | 50.2 | 68.2 |
| Untreated | 7.1 | 0% | 1900 | 50.2 | 68.2 |
| Untreated | 6.7 | 0% | 1900 | 44.4 | 68.2 |
| Untreated | 7.5 | 0% | 1900 | 56.3 | 68.2 |
| Untreated | 7.5 | 0% | 1900 | 56.3 | 68.2 |
| Average | 7.1 | 0% | 1900 | 51.0 | 68.2 |
| I | 0 | 1% | 2000 | 0.0 | 64.8 |
| I | 9.6 | 1% | 1850 | 91.8 | 70.1 |
| I | 10.0 | 1% | 1860 | 100.0 | 69.7 |
| I | 12.5 | 1% | 1860 | 156.3 | 69.7 |
| I | 14.6 | 1% | 1860 | 212.7 | 69.7 |
| I | 14.2 | 1% | 1880 | 200.7 | 68.9 |
| I | 12.9 | 1% | 1870 | 166.8 | 69.3 |
| I | 15.8 | 1% | 1870 | 250.7 | 69.3 |
| I | 16.3 | 1% | 1870 | 264.1 | 69.3 |
| Average | 13.2 | 1% | 1865 | 180.4 | 69.5 |

TABLE 6

LUBRICITY COMPARISON
ONE MONTH OLD, WEIGHTED MUD OF POOR QUALITY
(CONSTANT 1.8 AMPS)

| Mud System | Torquometer Reading (ft-lbf) | Percent of Additive by Volume | RPM | $X_1^2$ (ft-lbf)$^2$ | Motor Torque ft-lbf |
|---|---|---|---|---|---|
| Untreated | 0 | 0% | 2020 | 0.0 | 72.2 |
| Untreated | 9.6 | 0% | 1850 | 91.8 | 78.8 |
| Untreated | 9.2 | 0% | 1850 | 84.0 | 78.8 |
| Untreated | 8.8 | 0% | 1850 | 76.6 | 78.8 |
| Untreated | 9.2 | 0% | 1850 | 84.0 | 78.8 |
| Untreated | 8.8 | 0% | 1850 | 76.6 | 78.8 |
| Untreated | 10.0 | 0% | 1850 | 100.0 | 78.8 |
| Untreated | 9.6 | 0% | 1850 | 91.8 | 78.8 |
| Untreated | 9.6 | 0% | 1850 | 91.8 | 78.8 |
| Average | 9.3 | 0% | 1850 | 87.1 | 78.8 |
| I | 0 | 1% | 2000 | 0.0 | 72.9 |
| I | 17.1 | 1% | 1820 | 291.8 | 80.1 |
| I | 20.0 | 1% | 1820 | 400.0 | 80.1 |
| I | 20.8 | 1% | 1830 | 434.0 | 79.7 |
| I | 20.8 | 1% | 1820 | 434.0 | 80.1 |
| I | 21.7 | 1% | 1830 | 469.4 | 79.7 |
| I | 22.1 | 1% | 1830 | 487.7 | 79.7 |
| I | 23.3 | 1% | 1820 | 544.4 | 80.1 |
| I | 25.8 | 1% | 1850 | 667.4 | 78.8 |
| Average | 21.5 | 1% | 1827.5 | 466.1 | 79.8 |

TABLE 7

LUBRICITY COMPARISON
ONE MONTH OLD, WEIGHTED MUD OF POOR QUALITY
(CONSTANT 1.6 AMPS)

| Mud System | Torquometer Reading (ft-lbf) | Percent of Additive by Volume | RPM | $X_1^2$ (ft-lbf)$^2$ | Motor Torque ft-lbf |
|---|---|---|---|---|---|
| X | 0 | 1% | 2000 | 0.0 | 64.8 |
| X | 12.5 | 1% | 1900 | 156.3 | 68.2 |
| X | 11.7 | 1% | 1900 | 136.1 | 68.2 |
| X | 11.3 | 1% | 1900 | 126.6 | 68.2 |
| X | 11.3 | 1% | 1890 | 126.6 | 68.6 |
| X | 11.7 | 1% | 1840 | 136.1 | 70.4 |
| X | 11.7 | 1% | 1840 | 136.1 | 70.4 |
| X | 11.7 | 1% | 1840 | 136.1 | 70.4 |
| X | 11.7 | 1% | 1860 | 136.1 | 69.7 |
| X | 12.1 | 1% | 1860 | 146.0 | 69.7 |
| X | 12.1 | 1% | 1860 | 146.0 | 69.7 |
| Average | 11.8 | 1% | 1869 | 138.2 | 69.4 |
| I | 0 | 1% | 2000 | 0.0 | 64.8 |
| I | 19.2 | 1% | 1850 | 367.4 | 70.1 |
| I | 22.1 | 1% | 1850 | 487.7 | 70.1 |
| I | 21.7 | 1% | 1860 | 469.4 | 69.7 |

TABLE 7-continued

LUBRICITY COMPARISON
ONE MONTH OLD, WEIGHTED MUD OF POOR QUALITY
(CONSTANT 1.6 AMPS)

| Mud System | Torquometer Reading (ft-lbf) | Percent of Additive by Volume | RPM | $X_1^2$ (ft-lbf)$^2$ | Motor Torque ft-lbf |
|---|---|---|---|---|---|
| I | 22.1 | 1% | 1860 | 487.7 | 69.7 |
| I | 23.3 | 1% | 1880 | 544.4 | 68.9 |
| I | 23.8 | 1% | 1880 | 564.1 | 68.9 |
| I | 24.2 | 1% | 1880 | 584.0 | 68.9 |
| I | 25.0 | 1% | 1880 | 625.0 | 68.9 |
| I | 25.0 | 1% | 1880 | 625.0 | 68.9 |
| I | 24.2 | 1% | 1880 | 584.0 | 68.9 |
| Average | 23.0 | 1% | 1870 | 533.9 | 69.3 |

TABLE 8

LUBRICITY COMPARISON
ONE MONTH OLD, WEIGHTED MUD OF POOR QUALITY
(CONSTANT 1.8 AMPS)

| Mud System | Torquometer Reading (ft-lbf) | Percent of Additive by Volume | RPM | $X_1^2$ (ft-lbf)$^2$ | Motor Torque ft-lbf |
|---|---|---|---|---|---|
| X | 0 | 1% | 2000 | 0.0 | 72.9 |
| X | 15.0 | 1% | 1850 | 225.0 | 78.8 |
| X | 15.0 | 1% | 1850 | 225.0 | 78.8 |
| X | 15.4 | 1% | 1850 | 237.7 | 78.8 |
| X | 15.4 | 1% | 1840 | 237.7 | 79.2 |
| X | 15.0 | 1% | 1840 | 225.0 | 79.2 |
| X | 15.0 | 1% | 1840 | 225.0 | 79.2 |
| X | 15.8 | 1% | 1840 | 250.7 | 79.2 |
| X | 15.0 | 1% | 1830 | 225.0 | 79.7 |
| X | 15.0 | 1% | 1840 | 225.0 | 79.2 |
| X | 14.6 | 1% | 1830 | 212.7 | 79.7 |
| Average | 15.1 | 1% | 1841 | 228.9 | 79.2 |
| I | 0 | 1% | 2000 | 0.0 | 72.9 |
| I | 30.4 | 1% | 1830 | 925.2 | 79.7 |
| I | 31.3 | 1% | 1830 | 976.6 | 79.7 |
| I | 31.7 | 1% | 1830 | 1002.8 | 79.7 |
| I | 32.5 | 1% | 1820 | 1056.3 | 80.1 |
| I | 31.3 | 1% | 1820 | 976.6 | 80.1 |
| I | 34.2 | 1% | 1830 | 1167.4 | 79.7 |
| I | 34.2 | 1% | 1850 | 1167.4 | 78.8 |
| I | 34.2 | 1% | 1840 | 1167.4 | 79.2 |
| I | 34.2 | 1% | 1850 | 1167.4 | 78.8 |
| I | 34.6 | 1% | 1850 | 1196.0 | 78.8 |
| Average | 32.8 | 1% | 1835 | 1080.3 | 79.5 |

TABLE 9

LUBRICITY COMPARISON
ONE MONTH OLD, WEIGHTED MUD OF POOR QUALITY
(CONSTANT 1.6 AMPS)

| Mud System | Torquometer Reading (ft-lbf) | Percent of Additive by Volume | RPM | $X_1^2$ (ft-lbf)$^2$ | Motor Torque ft-lbf |
|---|---|---|---|---|---|
| Untreated | 0 | 0% | 2020 | 0.0 | 64.2 |
| Untreated | 7.1 | 0% | 1900 | 50.2 | 68.2 |
| Untreated | 7.1 | 0% | 1900 | 50.2 | 68.2 |
| Untreated | 7.1 | 0% | 1900 | 50.2 | 68.2 |
| Untreated | 7.1 | 0% | 1900 | 50.2 | 68.2 |
| Untreated | 7.1 | 0% | 1900 | 50.2 | 68.2 |
| Untreated | 6.7 | 0% | 1900 | 44.4 | 68.2 |
| Untreated | 7.5 | 0% | 1900 | 56.3 | 68.2 |
| Untreated | 7.5 | 0% | 1900 | 56.3 | 68.2 |
| Untreated | 7.5 | 0% | 1900 | 56.3 | 68.2 |
| Untreated | 8.3 | 0% | 1900 | 69.4 | 68.2 |
| Average | 7.3 | 0% | 1900 | 53.4 | 68.2 |

TABLE 9-continued

LUBRICITY COMPARISON
ONE MONTH OLD, WEIGHTED MUD OF POOR QUALITY
(CONSTANT 1.6 AMPS)

| Mud System | Torquometer Reading (ft-lbf) | Percent of Additive by Volume | RPM | $X_1^2$ (ft-lbf)$^2$ | Motor Torque ft-lbf |
|---|---|---|---|---|---|
| I | 0 | 2% | 2000 | 0.0 | 64.8 |
| I | 12.1 | 2% | 1860 | 146.0 | 69.7 |
| I | 15.4 | 2% | 1870 | 237.7 | 69.3 |
| I | 15.4 | 2% | 1880 | 237.7 | 68.9 |
| I | 14.6 | 2% | 1900 | 212.7 | 68.2 |
| I | 15.0 | 2% | 1900 | 225.0 | 68.2 |
| I | 17.9 | 2% | 1900 | 321.0 | 68.2 |
| I | 20.0 | 2% | 1900 | 400.0 | 68.2 |
| I | 17.9 | 2% | 1900 | 321.0 | 68.2 |
| I | 18.3 | 2% | 1900 | 336.1 | 68.2 |
| I | 20.0 | 2% | 1900 | 400.0 | 68.2 |
| Average | 16.7 | 2% | 1891 | 283.7 | 68.5 |

TABLE 10

LUBRICITY COMPARISON
ONE MONTH OLD, WEIGHTED MUD OF POOR QUALITY
(CONSTANT 1.8 AMPS)

| Mud System | Torquometer Reading (ft-lbf) | Percent of Additive by Volume | RPM | $X_1^2$ (ft-lbf)$^2$ | Motor Torque ft-lbf |
|---|---|---|---|---|---|
| Untreated | 0 | 0% | 2020 | 0.0 | 72.2 |
| Untreated | 9.6 | 0% | 1850 | 91.8 | 78.8 |
| Untreated | 9.2 | 0% | 1850 | 84.0 | 78.8 |
| Untreated | 8.8 | 0% | 1850 | 76.6 | 78.8 |
| Untreated | 9.2 | 0% | 1850 | 84.0 | 78.8 |
| Untreated | 8.8 | 0% | 1850 | 76.6 | 78.8 |
| Untreated | 10.0 | 0% | 1850 | 100.0 | 78.8 |
| Untreated | 9.6 | 0% | 1850 | 91.8 | 78.8 |
| Untreated | 9.6 | 0% | 1850 | 91.8 | 78.8 |
| Untreated | 9.6 | 0% | 1850 | 91.8 | 78.8 |
| Untreated | 9.6 | 0% | 1850 | 91.8 | 78.8 |
| Average | 9.4 | 0% | 1850 | 88.0 | 78.8 |
| I | 0 | 2% | 2000 | 0.0 | 72.9 |
| I | 22.1 | 2% | 1830 | 487.7 | 79.7 |
| I | 22.9 | 2% | 1830 | 525.2 | 79.7 |
| I | 25.8 | 2% | 1820 | 667.4 | 80.1 |
| I | 30.0 | 2% | 1850 | 900.0 | 78.8 |
| I | 32.1 | 2% | 1830 | 1029.3 | 79.7 |
| I | 32.5 | 2% | 1840 | 1056.3 | 79.2 |
| I | 30.8 | 2% | 1820 | 950.7 | 80.1 |
| I | 32.1 | 2% | 1850 | 1029.3 | 78.8 |
| I | 33.3 | 2% | 1850 | 1111.1 | 78.8 |
| I | 32.5 | 2% | 1850 | 1056.3 | 78.8 |
| Average | 29.4 | 2% | 1837 | 881.3 | 79.4 |

A statistical comparative analysis of all unweighted and weighted muds studied to date shows that the use of an additive as defined by Module 5 in an amount of up to 2.0% by volume gives superior results over previous products. In practice, the relative module concentrations for a given drilling fluid can be changed easily by one skilled in the art to convert an existing mud to a different mud system as desired. Factors to consider in deciding upon a desired mud system include the type of hole, i.e., vertical, slanted, deviated, directional, radial, multiradial, or horizontal, the type of formation that is being drilled, drilling economics, and environmental safety, among others apparent to one skilled in the art.

Further contemplated in the present invention is a kit containing the various modules of the invention. The kit can be conveniently prepackaged and used to address the drilling conditions encountered in the field.

In this aspect of the invention, the drilling mud kit comprises a plurality of containers, with their contents defined as follows:

(a) a first container containing a source of caustic, a natural wax, and a natural thinner;

(b) a second container containing aluminum metal, or the product of reacting aluminum metal, in combination with the contents of the first container;

(c) a third container containing at least one of an alkali metal phosphate, sodium silicate, and optionally borax, in combination with the contents of the first container;

(d) a fourth container containing a saturated or unsaturated carboxylic acid source, a surfactant, and a preservative, as defined above, in combination with the contents of the first container; and (e) a fifth container containing a combination of the components of the first, third and fourth containers.

Of course, the compositions in the containers of the kit set forth above are described in their simplest and premixed form, and other combinations are possible. For instance, those components of the third container that are additional to the contents of the first container can be provided alone in the third container instead of being premixed with the components of the first container. Similarly, the components unique to the fourth container can be provided separate from the contents of the first container.

The invention will now be described by way of examples which illustrate the present invention but do not limit it.

EXAMPLES

Example 1

A mud lubricant/thinner additive corresponding to a combination of Modules 1, 3 and 4, i.e., Module 5, was prepared and given the designation (I). In this composition, Module 1 was represented by a scour kier liquor, which was provided in no more than 40 cc per laboratory barrel of the total mixture (1 bbl=42 gallons in the field and 1 bbl=350 cc in the laboratory).

Module 3 was represented by trisodium phosphate (TSP) in an amount of 5.5 grams per 40 cc (or 48.1 lb/bbl).

Module 4 was represented by borax (preservative), borateam (surfactant), and raw cottonseed oil provided at 50% by volume. It is noted that the product viscosity may be changed (thinned) with the addition of mineral oil F, such as food grade mineral oil, e.g., FGA (Unocal), provided at 10% of the total volume of cottonseed oil.

To prepare the lubricant additive, the components are conveniently premixed in separate tanks as follows. Into Tank 1 is mixed 10 lbs borax, and 5 lbs borateam detergent (borax and borateam react in water to form boric acid and the borateam acts as a surfactant), and the tank is made up to 1 bbl with water. Into Tank 2 is placed 48.1 lbs TSP per barrel of kier liquor. Into Tank 3 is added 500 gallons of raw cottonseed oil, which forms an emulsion base for a stand alone base module.

Example 2

The lubricant additive is then prepared in a 55 gallon drum from the contents of the Tanks 1, 2 and 3 described above. Thus, 27.5 gallons of raw cottonseed oil from Tank 3 is filled into the drum, then 4.5 gallons of the kier liquor containing TSP from Tank 2 is added. Next, 23 gallons of the preservative/surfactant solution in Tank 1 is added to the drum. A lubricant/thinner additive representing Modules 1, 3 and 4, i.e., Module 5, is thereby formed, which was designated formulation (I).

Example 3

An aluminated composition representative of Module 2 can be separately formed. This material thickens oil and reduces the need for siliceous solids in order to emulsify oil to produce a very thick grease. The consistency or viscosity of the aluminated product can be modified, i.e., thinned by addition of a mineral oil, e.g., FGA, or thickened by addition of Al metal which reacts to produce aluminate ions.

Thus, 0.2 g pure Al metal is added to 40 cc scour kier liquor (laboratory scale), and the balance of 350 cc is made up with water. The amount of Al metal added can be adjusted as needed depending upon the drilling conditions.

Example 4

Performance Evaluation and Validation

Different drilling mud lubricants according to the invention were compared with prior art formulations. The prior art ester lubricant referred to herein as lubricant (X) was compared with a formulation of the invention, referred to herein as (I). As shown in Table 7 and in FIG. 1, the "friction factors" for (X) and (I) were 0.36 and 0.20, respectively. The respective slopes of the lines shown therein are referred to herein as the "friction factors". As is apparent from FIG. 1, assuming a $13 per gallon price, lubricant (X) provides just 36 units ($13/0.36), whereas lubricant (I) provides 65 units ($13/0.20). Thus, formulation (I) performs 1.81 times better than lubricant (X) for the same unit cost.

Figure 1:
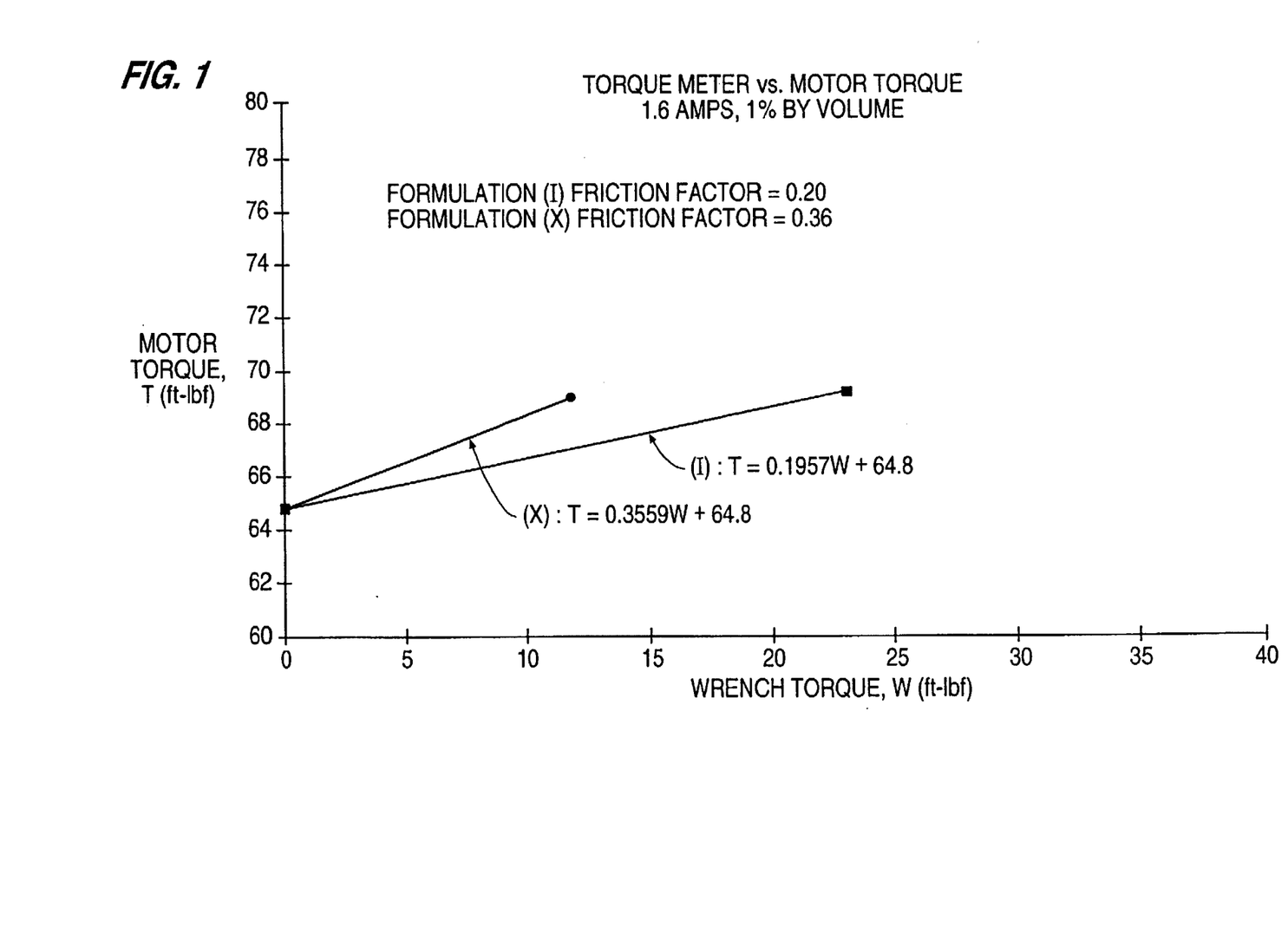
FIG. 1 depicts a comparison of the motor torque versus wrench torque at constant 1.6 amps for an instant drilling mud formulation (I) compared with prior art substance (X). Drilling mud (I) has combined and simultaneous thinning and lubricating properties, which is representative of Module 5. Prior art substance (X), which is a drilling fluid having brand-name XL (Turbochem Corp., Lafayette, La.) is a widely used nickel ester salt drilling fluid having lubricating properties without thinning properties.
Figure 2:
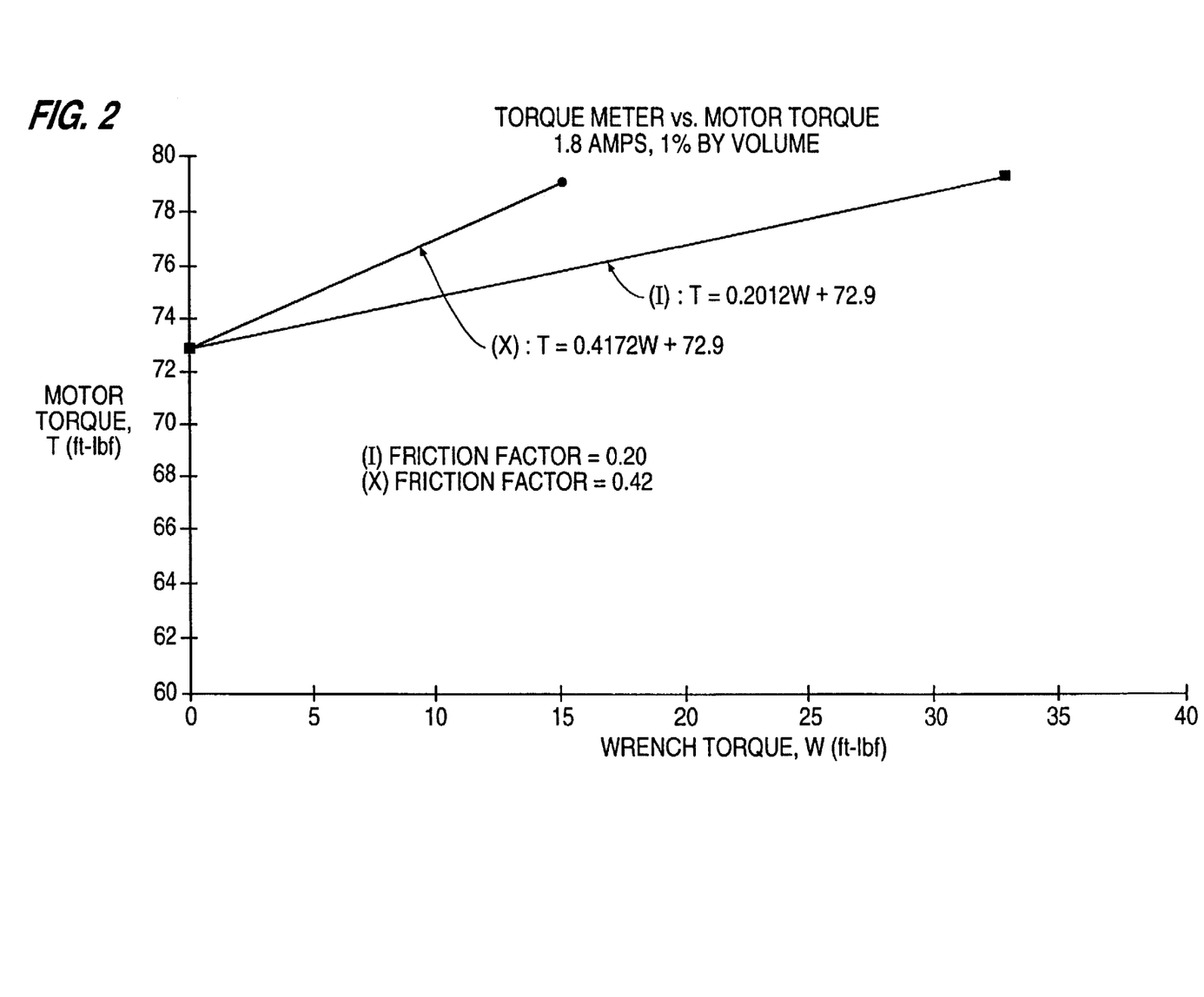
FIG. 2 depicts the results of the studies as in FIG. 1 which are obtained at constant 1.8 amps.
Figure 3:
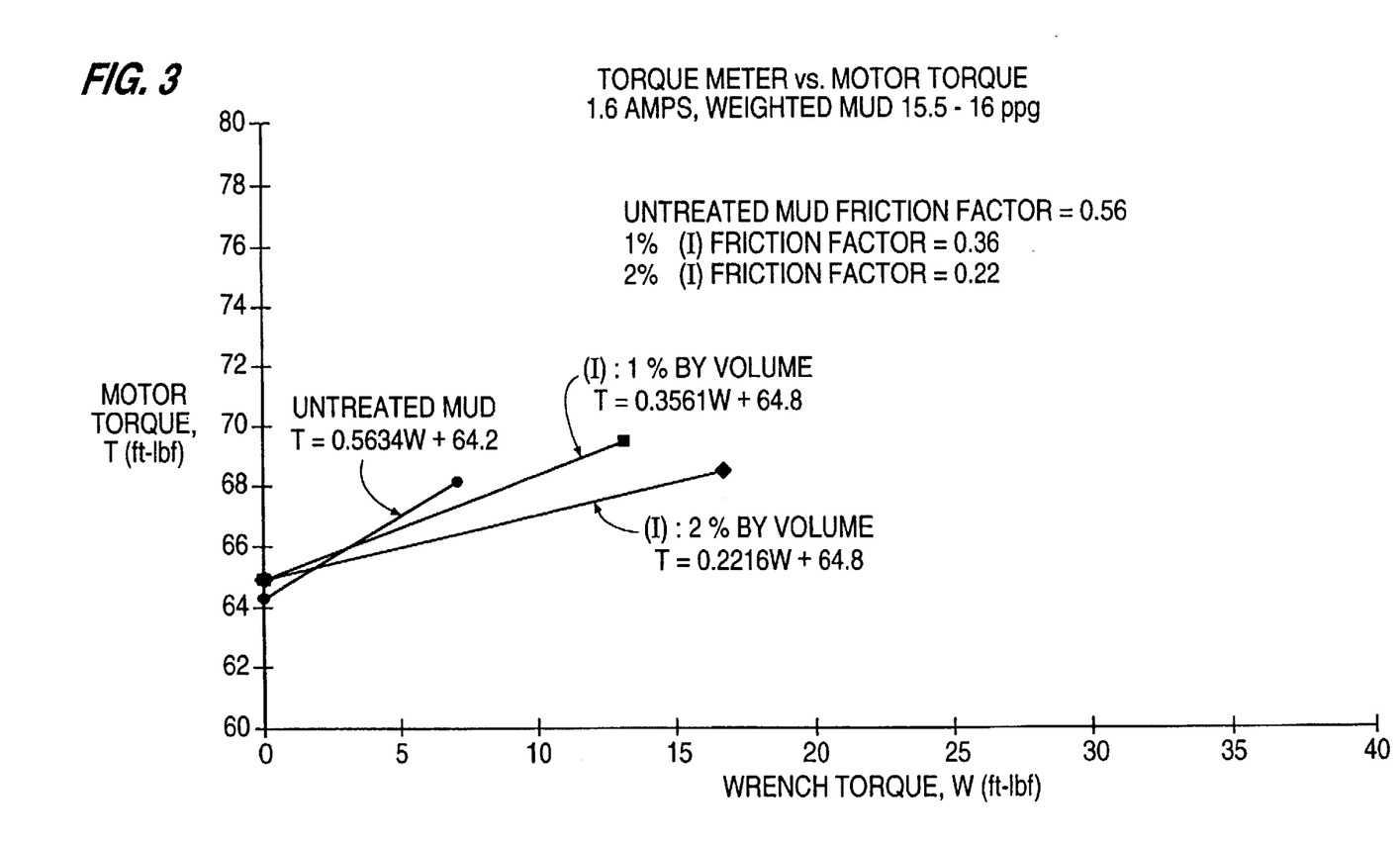
FIG. 3 depicts the motor torque versus wrench torque at constant 1.6 amps for an untreated mud, and the same mud containing additive (I) at 1% and 2% by volume.
Figure 4:
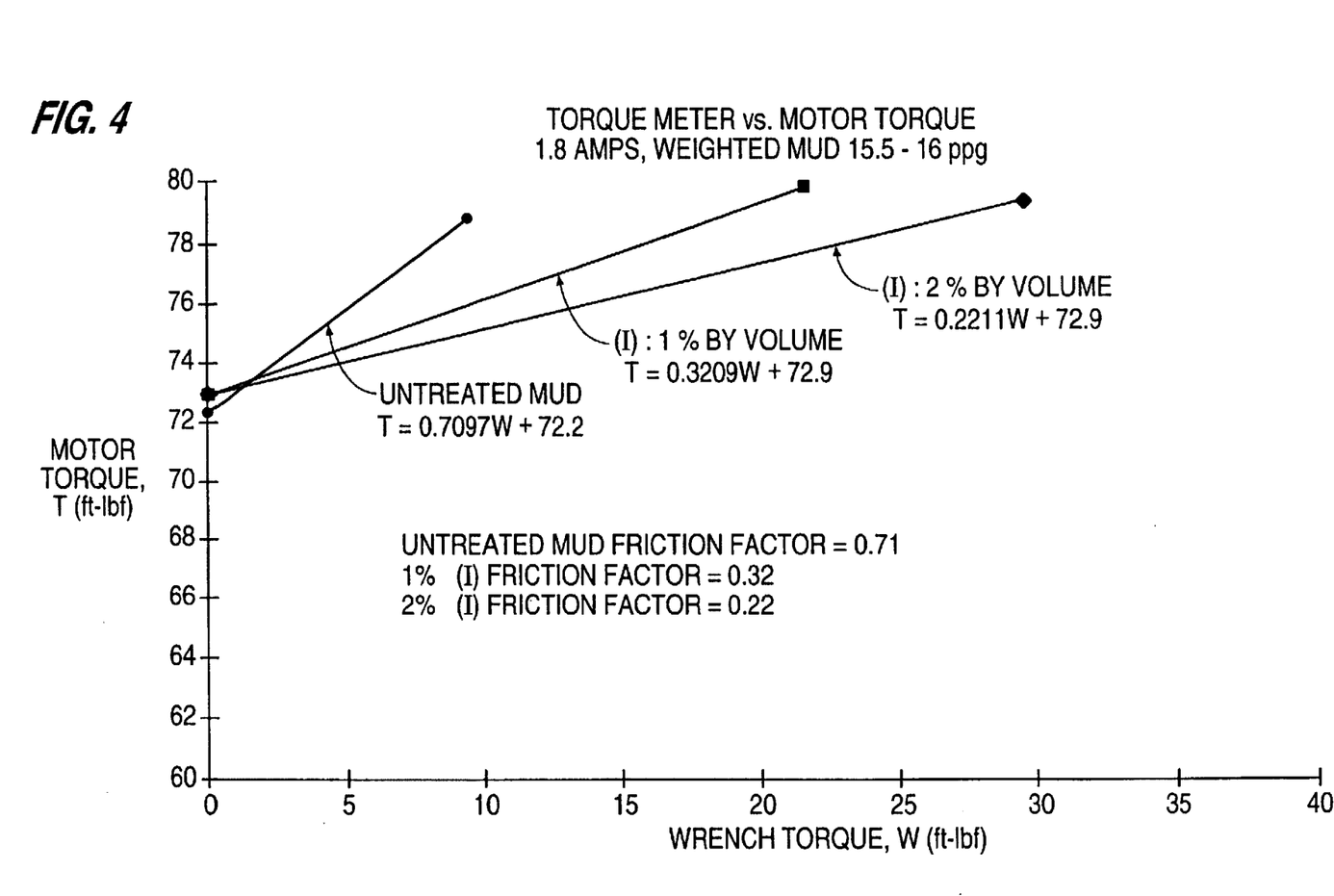
FIG. 4 depicts the motor torque versus wrench torque at constant 1.8 amps using an untreated mud, and the same mud containing additive (I) at 1% and 2% by volume.

As shown in Table 8 and FIG. 2, the analogous comparison at constant 1.8 amps gives lubricant (X) 31 units ($13/0.42) and lubricant/thinner (I) 65 units ($13/0.20). Under these conditions, an instant formulation performs 2.10 times better for the same unit cost as lubricant (X).

In the Tables and the Figures, the motor torque $(T_m)$ is referred to in ft-lb. The motor torque $T_m$ is given by the following formula:

$$T_m = P/W \tag{1}$$

In formula (1), P represents the horsepower where 1.0 horsepower=550 ft-lb/second. The horsepower is determined by the following formula:

$$P = I \times V/W \tag{2}$$

The variable I represents the current draw when the motor is loaded in amperes. Variable V represents electrical energy source in volts. In both equations (1) and (2), W represents the motor rotational velocity in revolutions per second. Variable W is given by the following formula:

$$W = 2 \times 3.14 \times N/60 \tag{3}$$

where N is revolutions per minute (rpm in the Tables).

Also presented in the Tables is the parameter for torquometer reading corresponding to a given motor torque. The torquometer reading is simply the gauge measurement in ft-lb.

The laboratory data were subjected to a statistical analysis to determine the standard deviation and a comparison t-test. These statistical results are summarized in Table 11 hereinbelow. The least squares fit to the data is shown as lines in FIGS. 1–4.

TABLE 11

STATISTICAL ANALYSIS

| Data in Table No.: | S | t |
|---|---|---|
| 3 | 1.050 | 9.914 |
| 4 | 1.301 | 17.014 |
| 5 | 1.762 | 6.917 |
| 6 | 1.823 | 13.317 |
| 7 | 1.309 | 19.286 |
| 8 | 1.144 | 34.611 |
| 9 | 1.844 | 11.369 |
| 10 | 2.993 | 14.972 |

Example 5

The results of a typical performance evaluation are presented in Table 12 hereinbelow. Such measurements as viscosity, yield point, gel strength at 10 seconds and 10 minutes, mud temperature, drag at 6° hole deviation, fluid loss when treated by anionic polyacrylamide, standpipe pressure drop, reaction torque, filter cake characterization, flow rate, drilling rate at the weight-on-bit (WOB) at $R_1$, bit life, mud weight, time to Kelly down, and solids control are given in Table 12. Particularly significant comparisons are the drilling rate and time to Kelly down by one pipe joint (30 feet), gel strength viscosity, fluid loss, and reaction torque of pipe in the 6° deviated hole.

As shown in Table 12, when compared with an untreated mud, a mud system containing just 0.001% of formulation (I), representative of Module 5, is clearly superior. Moreover, a typical whole caliper log shows some hole washout prior to mud treatment; however, after treatment at 0.001% by volume the caliper log shows a near perfect gauge hole.

TABLE 12

FIELD PERFORMANCE EVALUATION AND VALIDATION

| Drilling Properties | Untreated Mud | Treated Mud with 0.001% Additive |
|---|---|---|
| Viscosity (Cp) | 17 | 10 |
| Yield Point | 8 lb/100 ft² | 5 lb/100 ft² |
| Gel Strength (10 sec/10 min) | 2/50 | 0/4 |
| Mud Temp. (approx.) | 100° F. | 100° F. |
| Drag (at about 6° deviation) | 20,000 lbs | 5,000 lbs |
| Fluid loss | 8 cc (treated with anionic polyacrylamide) | 6.5 cc (without additional treatment) |
| Standpipe pressure drop | 1000 PSI | 950 PSI |
| Reaction torque (approx.) | 1.5 turns | <0.5 turns |
| Filter cake | thin | ultra thin and slick, uniform, resilient |
| Flow rate | 248 gal/min | 248 gal/min |
| Drilling rate at WOB = $R_1$ | 12,000 lbs | 8,000 lbs* |
| Bit life | 65 hours (estimated by manufacturer) | 79 hours with 2/2/G (actual performance) |
| Mud weight (lbs/gal) | 9.5 | 9.5 |
| Time to Kelly down (30 ft) | 45 min | 30 min** |
| Solids control | Shaker & desander only | Shaker & desander only |

*This represents a 33.3% increase in drilling rate
**This further confirms an increase in drilling rate The toxicity of an instant formulation was compared with EPA 7 generic mud and the EPA certified laboratory reports the product is non-toxic and the value for LC 50 is greater than 1.000.000 ppm at a typical average dosage of 1.5% by volume.

Example 6

Some physical characteristics of an instant lubricant/thinner are that it has a specific gravity of between 1.001 and 0.998 g/cc, a surface tension of 24.2 dynes/cm, and a color indicating a nonfluorescent black liquid.

The present invention has been described hereinabove with some degree of particularity in order to illustrate various aspects of the invention. However, it should be appreciated that the scope of the claimed invention is defined by the appended claims, and obvious equivalents thereof.

What is claimed is:

1. A drilling mud system comprising at least one of the following modules:
   an alkaline first module that contains a source of caustic, a natural wax, and a natural thinner;
   a second module prepared by reacting aluminum metal with the components of said alkaline first module thereby forming a soluble alkali metal aluminate;
   a third module containing said components of said first module in combination with at least one of an alkali metal phosphate and sodium silicate;
   a fourth module containing said components of said first module in combination with a saturated or unsaturated carboxylic acid source, a surfactant, and a preservative; and
   a fifth module containing said components of said first module in combination with a saturated or unsaturated carboxylic acid source, a surfactant, a preservative, and at least one of an alkali metal phosphate and sodium silicate,
   wherein said third, fourth and fifth modules can be used for simultaneously thinning and increasing the lubricity of a drilling mud, and said second module can be used for thickening a drilling mud.

2. The drilling mud system of claim 1, wherein said first module is composed of scour kier liquor.

3. A drilling mud prepared by reacting aluminum metal with a composition containing a caustic, a natural wax, a natural thinner, thereby forming a soluble alkali metal aluminate.

4. A drilling mud containing a source of caustic, a natural wax, a natural thinner, and at least one of an alkali metal phosphate and sodium silicate.

5. The drilling mud of claim 4, further comprising borax.

6. The drilling mud of claim 4, wherein the alkali metal phosphate is selected from the group consisting of mono-, di-, and tri-sodium phosphate, mono-, di-, and tri-potassium phosphate, and mono-, di-, and tri-cesium phosphate.

7. A drilling mud containing a caustic, a natural wax, a natural thinner, a saturated or unsaturated carboxylic acid source, a surfactant, and a preservative.

8. A drilling mud containing a caustic, a natural wax, a natural thinner, a saturated or unsaturated carboxylic acid source, a surfactant, a preservative, and at least one of an alkali metal phosphate and sodium silicate.

9. A drilling method comprising injecting a drilling mud according to claim 1 into a borehole and drilling into the earth.

* * * * *